United States Patent
Ito et al.

[15] 3,678,787
[45] July 25, 1972

[54] HYDRAULIC CONTROL SYSTEM FOR AUTOMATIC TRANSMISSION

[72] Inventors: Shin Ito; Seitoku Kubo, both of Toyota-shi, Japan

[73] Assignee: Toyota Jidosha Kogyo Kabushiki Kaisha, Toyota-shi, Japan

[22] Filed: April 3, 1970

[21] Appl. No.: 25,403

[30] Foreign Application Priority Data

July 29, 1969 Japan..................................44/60157

[52] U.S. Cl..........................................................74/864
[51] Int. Cl........................................................B60k 21/02
[58] Field of Search ......................74/863, 864, 868, 869

[56] References Cited

UNITED STATES PATENTS

| | | | |
|---|---|---|---|
| 2,711,656 | 6/1955 | Smirl | 74/868 X |
| 3,230,791 | 1/1966 | Kelley et al. | 74/864 |
| 2,693,711 | 11/1954 | Kelbel et al. | 74/863 |
| 2,890,605 | 6/1959 | Smirl | 74/864 X |
| 2,908,181 | 10/1959 | Smirl | 74/864 |
| 3,001,415 | 9/1961 | Smirl | 74/864 X |
| 3,505,909 | 4/1970 | Maurice | 74/864 |

Primary Examiner—Carlton R. Croyle
Assistant Examiner—Thomas C. Perry
Attorney—Cushman, Darby & Cushman

[57] ABSTRACT

A hydraulic control system for an automatic transmission including a transmission gear system provided with hydraulic servos for the brake bands or the clutches, wherein, in addition to a pressure regulator valve for controlling pressure oil applied to said servos and shift valves for establishing low and high forward drive ratios, a diaphragm mechanism is provided to additionally apply the engine intake manifold vacuum to the pressure regulator valve so that said drive ratios are varied by the operation of said shift values and at the same time the action of the engine suction applied to the pressure regulator valve is changed through the associated oil passages to vary the control action of the pressure regulator valve to thereby smooth out the shifts.

3 Claims, 15 Drawing Figures

INVENTORS
SHIN ITO
SEITOKU KUBO

ATTORNEYS

HYDRAULIC CONTROL SYSTEM FOR AUTOMATIC TRANSMISSION

BACKGROUND OF THE INVENTION

1. Field of the Invention

The present invention relates to a hydraulic control system for automatic transmissions and more particularly to the control of line pressures which will be directed into the servo chambers of servos for clutches, brake bands, etc., wherein this control of line pressures is varied in accordance with the engine suction and the operation of shift valves. In fact, the present invention relates to improvements in "the hydraulic control system for fluid type automatic transmission" disclosed in the applicant's copending application Ser. No. 884,476 filed on Dec. 12, 1969.

2. Description of the Prior Art

In other words, the invention disclosed in the aforesaid copending application relates to a control system wherein the pressure regulating operation is changed in accordance with the operation of the shift valves. In other words, when a 1-2 shift valve is actuated thus changing the arrangement of gears into second gear, the line pressure is reduced lower than line pressure $P_L$ that exists when the gears are in first. While this control system has the advantage of eliminating the need to especially provide valve means (generally, there are a compensator valve and throttle relay valve) which have hitherto been used for varying the fluid pressure controlling action of the pressure regulator valve and thus incorporating the hydraulic circuit in a very compact form, a shock is produced during shifting by a manual valve, for instance, during shifting from N position (neutral range) to D position (drive range) or from N position to R position (reverse range). Similarly, a heavy shock is produced during the power off and upshift at lower speeds causing inconvenience to the smoothness of automatic shifts.

SUMMARY OF THE INVENTION

In order to eliminate these drawbacks, the present invention contemplates to effect the control action of the pressure regulator valve in accordance with the load of the engine, i.e., the engine suction, too. Thus, the constitution of the improved subject matter of the present invention resides in a hydraulic control system for an automatic transmission incorporating a transmission gear provided with hydraulic servo means for brake band means, clutches and the like, said hydraulic control system comprising a pressure regulator valve for controlling the pressure oil (line pressure $P_L$) applied to said hydraulic servo means, diaphragm means to cause the action of the engine suction to be added to said pressure regulator valve, shift valves actuated by signals which correspond to various driving conditions of the vehicle so that pressure oil is supplied to or discharged from said hydraulic servo means to actuate the transmission gear to establish a low forward drive ratio and a high forward drive ratio, and oil passage means connecting said pressure regulator valve and said shift valves with one another, characterized in that said drive ratios are varied according to the actuation of said shift valves and simultaneously the action of engine suction applied to the pressure regulator valve is varied through said oil passage means whereby the control action of said pressure regulator valve is changed to cause changes in hydraulic oil pressures before and after the actuation of the shift valves. Thus, according to the present invention the line pressure $P_L$ applied to the hydraulic servo means is most effectively controlled in accordance with various driving conditions of the vehicle so that a shock in automatic shifts will not be increased by an unnecessarily excessive pressure and the loss of an oil pump will not be increased excessively, while simultaneously no excessive brake band slip and clutch slip due to any inadequate pressure level may take place.

Other features of the present invention will be apparent from the following detailed description taken in conjunction with the accompanying drawings.

DESCRIPTION OF THE PREFERRED EMBODIMENTS

The present invention will now be described in detail with reference to the preferred embodiments.

STRUCTURE OF TRANSMISSION

Figure 1:
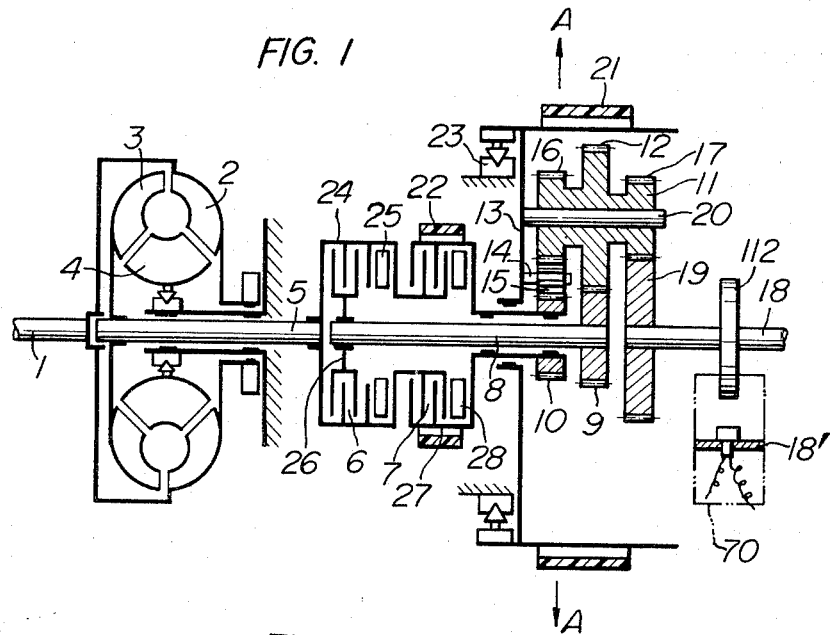
FIG. 1 is a sectional view showing an example of the transmission incorporating the system of the present invention.

As an embodiment of the transmission, the torque converter automatic transmission having three forward speeds and one reverse speed as shown in FIG. 1 will be explained by way of a typical example. This figure is designed to show the principle of operation of such a hydraulic automatic transmission.

In the torque converter, a pump turbine 2 is directly coupled to an engine crankshaft 1 so that power from the engine is transmitted by this pump turbine 2 to a turbine wheel 3 through the medium of oil which is in turn guided by a stator 4 and then reenters the pump turbine 2. Repetition of this process of oil flow continuously imparts the torque or turning effort to a turbine shaft 5. The torque thus delivered is transmitted through the turbine shaft 5 to a transmission gear system disposed to the rear of the torque converter means, thereby a transmission having three forward ranges and one reverse range is provided through the automatic control, in the well-known manner, of multiple disk clutch means 6 and 7 and brake band means 21 and 22 by means of the required hydraulic pressure from the servo means and a planetary gear system.

The structure of the transmission gear system disposed to the back of the torque converter will now be described. The turbine wheel 3 is connected to the turbine shaft 5 providing an input shaft of the planetary gear system. This turbine shaft 5 is integrally splined to a drum 24. Disposed within the drum 24 is a multiple disk clutch 6 (hereinafter referred to as a front clutch) which will be either ON (engaged) or OFF (disengaged) in accordance with the movement of a hydraulically actuated piston 25 through back springs. Drive plates of the front clutch 6 are integrally splined on the outer periphery thereof to the drum 24, and the clutch disks are internally splined to a hub 26 in a manner that prevent slipping. The hub 26 is integrally splined to an intermediate shaft 8. The front clutch drum 24 is also splined to the clutch disks of a multiple disk clutch 7 (hereinafter referred to as a rear clutch) in the illustrated manner to prevent slipping and thus rotate as a unit.

The driven plates of the rear clutch 7 are, on the outer periphery thereof, splined to a clutch drum 27 to turn together as a unit. And the rear clutch 7 is turned on and off by means of a piston 28.

Figure 2:
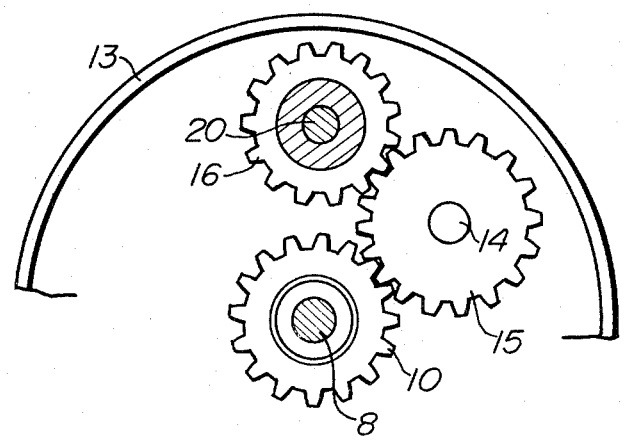
FIG. 2 is a partial sectional view taken on the line A—A in FIG. 1, showing in detail the relationship between an idler gear which is not shown and the associated gears.

The intermediate shaft 8 integrally splined to the hub 26 of the front clutch 6 is integrally connected at its rear end to an input sun gear 9. The rear clutch drum 27 is integrally connected to a reverse sun gear 10 by a suitable slip prevention means. The input sun gear 9 is meshed with a gear 12 of a plurality of (for example, two or three sets) circumferentially arranged planetary gear train pinions 11. The reverse sun gear 10 is meshed with an idler gear 15 (shown in FIG. 2) which is slidably mounted on a pin 14 studded on a carrier 13, and a gear 16 of the pinions 11 is meshed with the idler gear 15.

The rearmost gear 17 of the pinions 11 is meshed with a gear 19 of a transmission output shaft 18. The carrier 13 carries the pinions 11 comprising the gears 16, 12 and 17 by means of a pinion pin 20 and the pinion or idler gear 15 by means of the pin 14 as previously stated. The carrier 13 is provided with a braking band 21 (hereinafter referred to as a rear brake band) so that the carrier 13 may be held stationary or released to freely rotated by causing the rear brake band 21 to be on or off. Similarly, the rear clutch drum 27 has a band 22 (hereinafter referred to as a front brake band) disposed around its outer periphery so that the drum 27 and hence the sun gear 10 may be held stationary or allowed to rotate by causing the front brake band 22 to tighten on or become free of the drum 27.

A one-way brake 23 built into the carrier 13 functions in the similar manner as the rear brake band 21 in low gear which will be discussed later.

With the arrangement described above, the transmission operation which provides three forward ranges and one reverse range will be discussed hereinafter.

First speed—The front clutch 6 and the rear brake band 21 are caused to come into operation. (However, if the transmission is operated from the engine, this actuation of the rear brake band 21 will not be needed owing to the provision of the one way brake 23 since the one way brake 23 operates to produce the same result without the operation of the rear brake band 21. In this case, however, no power is transmitted from the output shaft.) In this state, the rotation of the turbine shaft 5 is directly carried to the input sun gear 9 through the front clutch 6. Since the carrier 13 is held stationary by the rear brake band 21, the pinion pin 20 is also held stationary entering into the same relation as the ordinary gear train so that the input rotation is carried from the gear 9 to the gear 12 and from there to the gear 19 on the output shaft 18 through the gear 17 in a speed reducing relation.

Second speed—With the front clutch 6 remaining on, now the rear brake band 21 is off and the front brake band 22 is on. When this happens, the turbine shaft 5 and the input sun gear 9 turn together as a unit, but the clutch drum 27 and hence the reverse sun gear are held stationary by the front brake band 22. In this condition, the rotary motion of the turbine shaft 5 is directly transmitted to the input sun gear 9 which in turn acts in a manner to rotate the pinions 11 in a direction (counterclockwise) opposite to the direction of rotation (clockwise) of the turbine shaft 5. This movement tends to turn the gear 15 clockwise through the gear 16. However, since the gear 10 meshed with the gear 15 is held stationary, the pinion pin 14 revolves clockwise around the stationary sun gear 10. This rotary motion is added to the input sun gear 9 and the output shaft gear 19 which rotate in the same direction as the turbine shaft 15. The effect of this addition is greater than on the input shaft side since the number of teeth in the gear 12 is selected to be larger than the number of teeth in the gear 17 and this causes the intermediate shaft 8 to rotate at a speed higher than the number of revolutions of the output shaft 18. That is, a speed reduction is obtained.

Third speed—This is obtained with both the front and rear clutches on. The input sun gear 9 and the reverse sun gear 10 rotate together as a unit and the whole planetary gear system thus turns as a unit so that the out-put shaft 18 rotates at the same speed as the turbine shaft 5.

Reverse—In reverse, the rear clutch 7 and the rear brake band 21 are applied. This holds the carrier 13 and hence the pinion pins 14 and 20 against rotation, and the rotary motion from the turbine shaft 15 is carried to the reverse sun gear 10 through the rear clutch 7 and then to the gear 19 on the output shaft 18 through the pinions 15 and 17 to reverse the direction of rotation of the output shaft 18.

HYDRAULIC ACTUATION CIRCUIT

The construction of a hydraulic actuation circuit incorporated in one embodiment of the present invention is illustrated in FIGS. 3 through 8. The circuit generally comprises an oil pressure source 100 and an actuation circuit 110 which is composed of a manual valve 120, 1–2 shift means 130, 2–3 shift means 135, a check valve 140 and oil passages. The oil pressure source 100 includes an oil pump 101, an oil strainer 102, a pressure regulator valve 105, diaphragm mean 105, a check valve 103, and an oil cooler 104. The oil pressure source 100 functions to provide the torque converter working oil, gear lubricating oil and oil under pressure for the said hydraulic actuation circuit.

Figure 3:
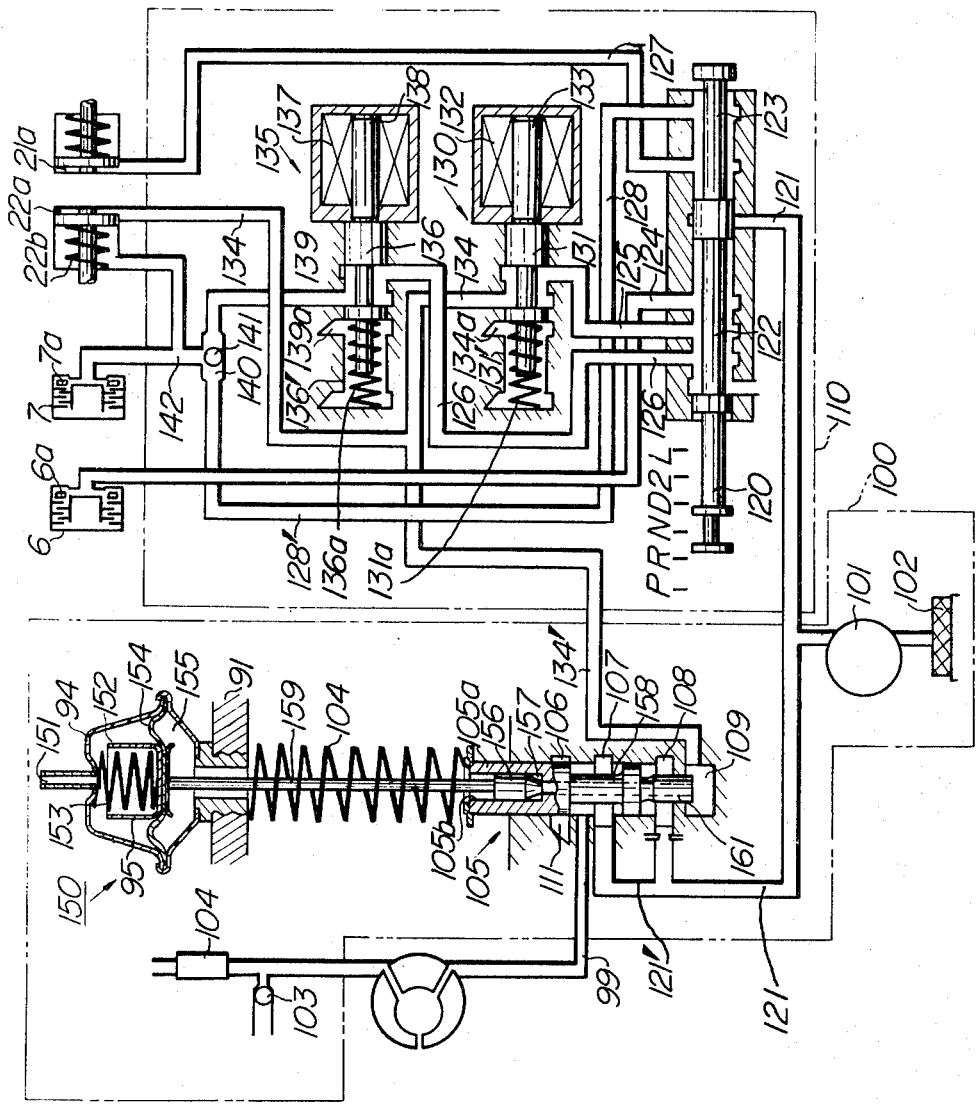
FIGS. 3 through 8 are schematic sectional views showing a hydraulic actuating circuit incorporated in the system of the present invention in various operating positions of the circuit, FIG. 3 showing conditions in the N position, FIG. 4, conditions in the D position—1st speed, FIG. 5, conditions in the D position—2nd speed, FIG. 6, conditions in the D position—3rd speed, FIG. 7, conditions in the 2 position—2nd speed, FIG. 8, conditions in the R position.
Figure 4:
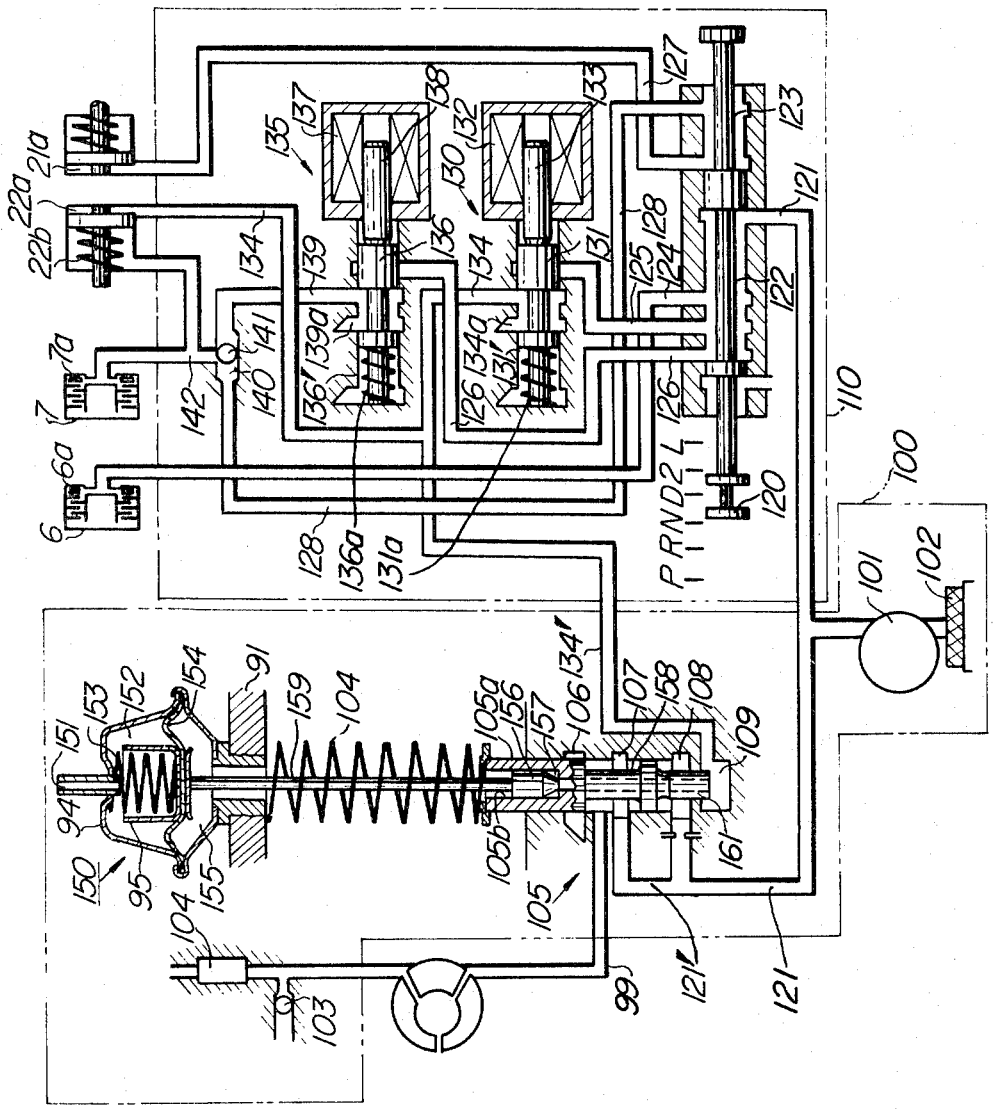
Figure 5:
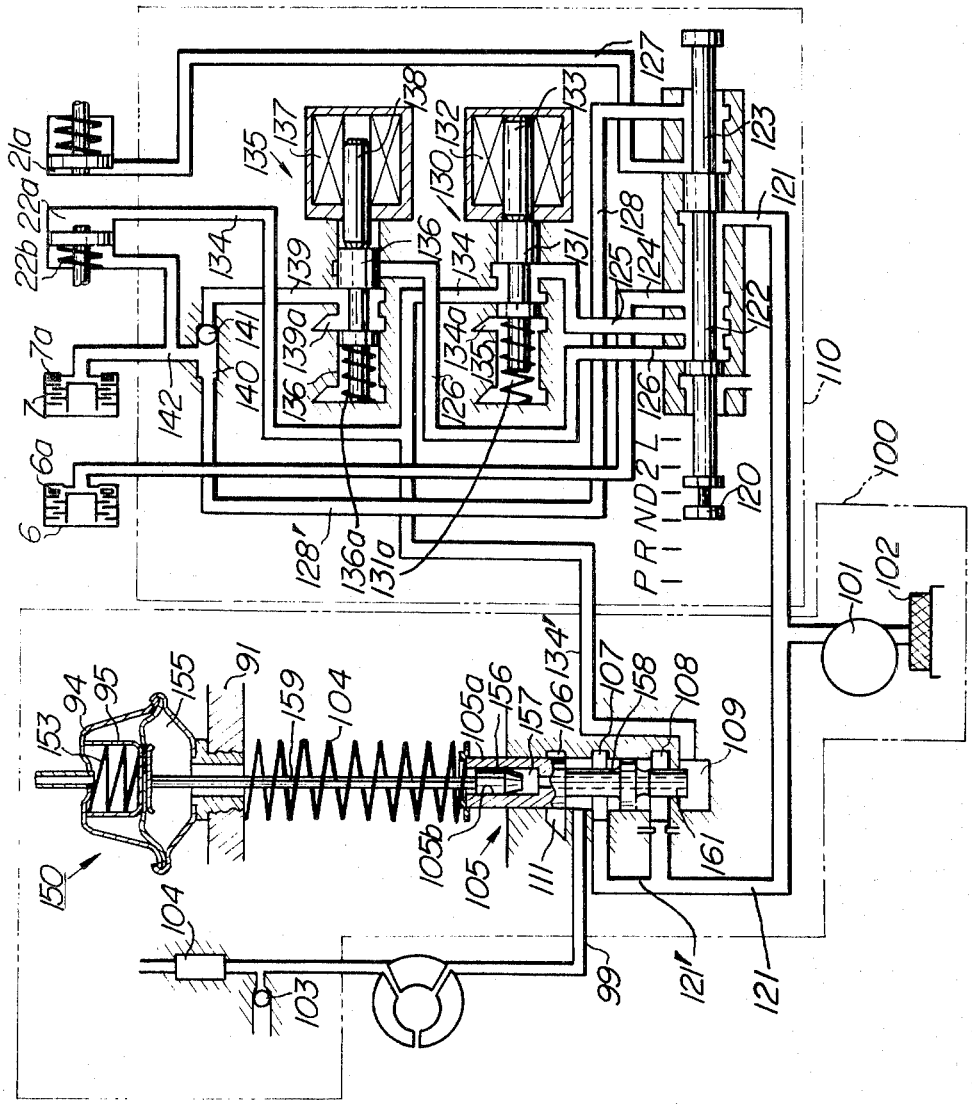
Figure 6:
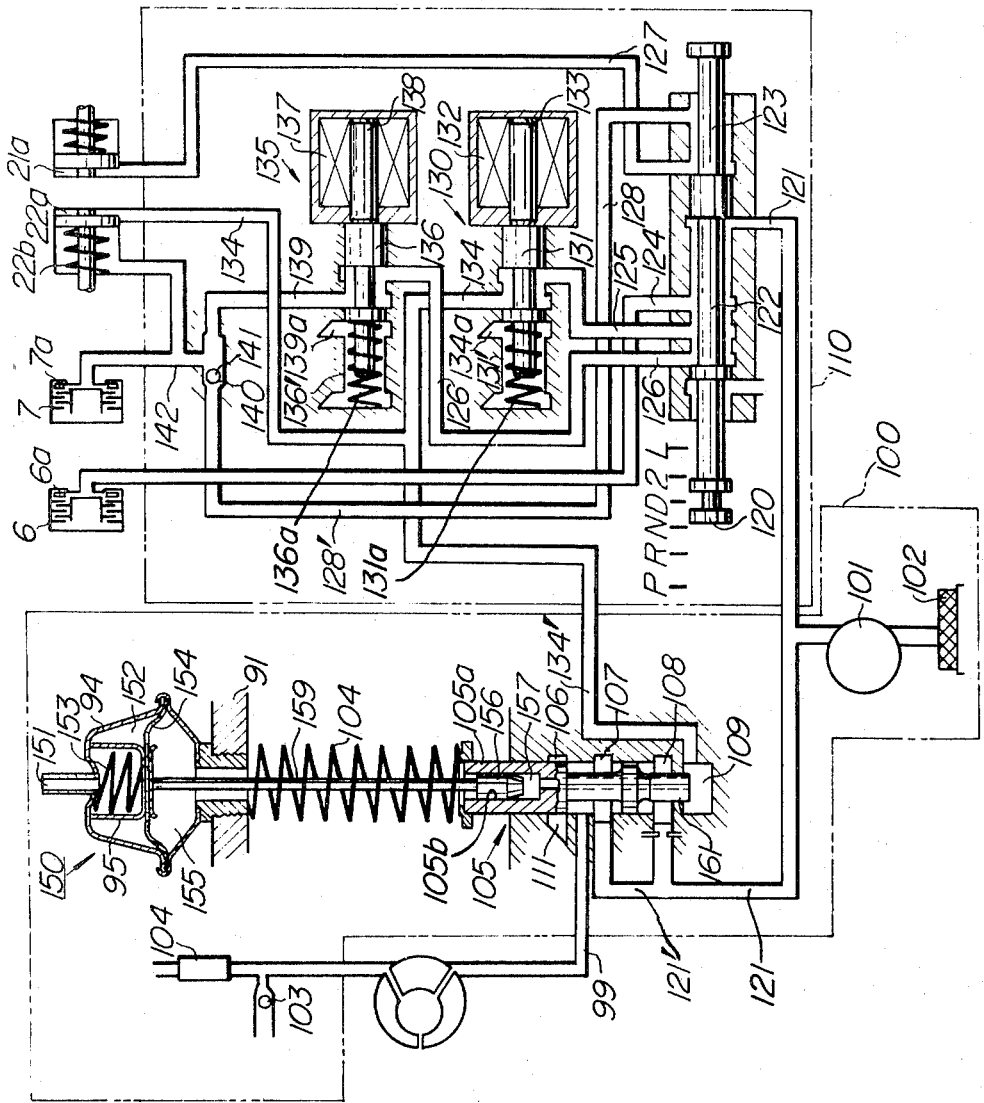
Figure 7:
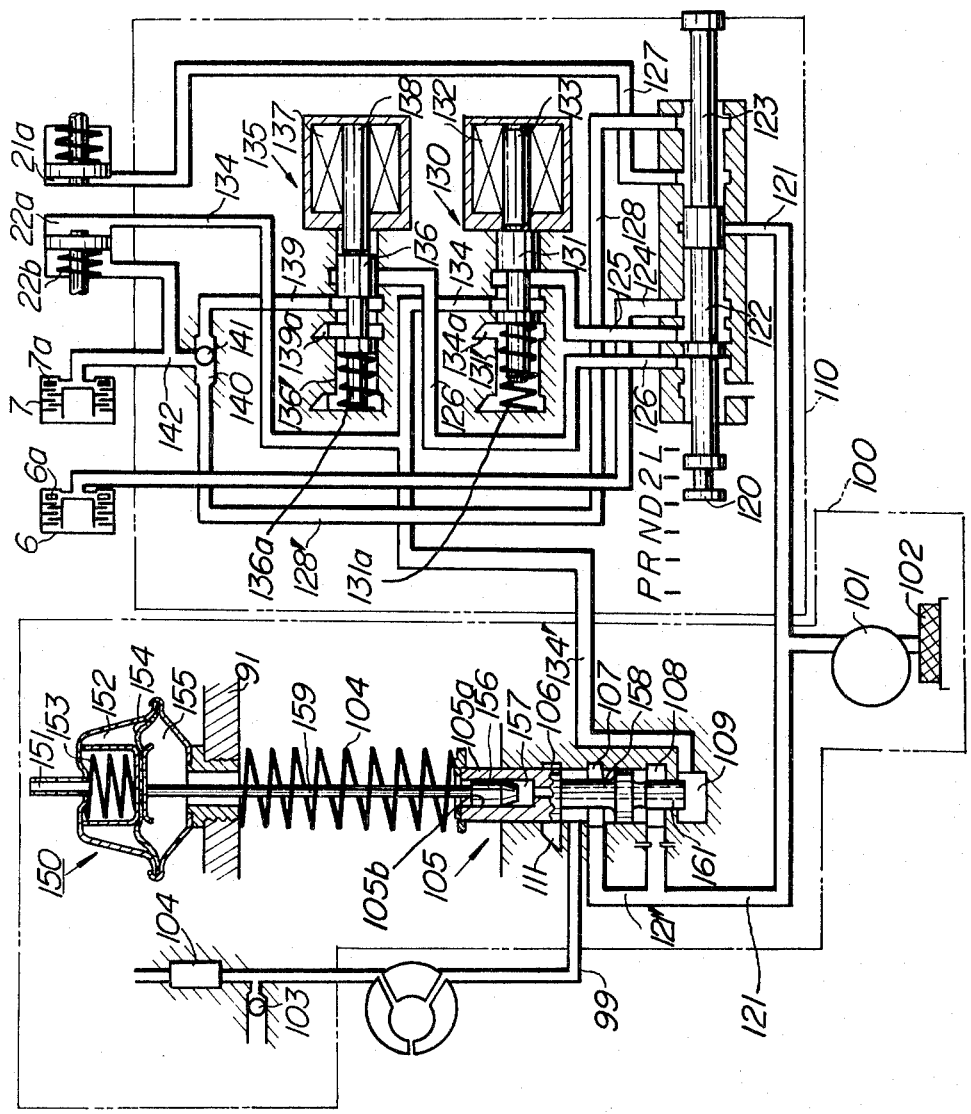

The manual valve 120 is linked to a shift lever (not shown) installed in the driver's compartment and has six positions: P, R, N, D, 2 and L. Assuming that the manual valve 120 is in the N position, as shown in FIG. 3, an oil passage 121 is cut off and valve chambers 122 and 123 are exhausted. With the manual valve 120 in the D position, the oil passage 121 communicates with oil passages 124, 125 and 126 as shown in FIGS. 4 through 6. The oil passage 124 directly communicates with the front-clutch servo chamber 6a, the oil passage 125 communicates through the 1–2 shift means 130 with the apply side of a servo piston for the front brake band 22, and the oil passage 126 with the rear-clutch servo chamber 7a and the front band release side 22b through the 2–3 shift means 135 and the check valve 140. The 1–2 shift means 130 comprises a valve 131 and a solenoid 132, and one end (the right end in the illustration) of the valve 131 is abutted by a moving core 133 of the solenoid 132. When no current is supplied to the solenoid 132, the valve 131 is moved to its rightward position by a spring 131a engaging the other end (the left end in the illustration) of the valve 131 so that the oil passages 125 and 134 communicate with each other and the front band 22 is applied. When the solenoid 132 is energized, its electromagnetic force causes the moving core 133 to move the valve 131 to the left so that the oil passage 125 is cut off from the oil passage 134 and the oil passage 134 communicates with a pressure discharge port 134a to release the front brake band 22. Similarly, the 2–3 shift means 135 is composed of a valve 136 and a solenoid 137, and one end (the right end in the illustration) of the valve 136 is engaged by a moving core 138 of the solenoid 137. With the solenoid 137 being deenergized, the valve 136 is moved to its rightward position by a spring 136a engaging the other end (the left end in the illustration) of the valve 136 so that the oil passage 126 communicates with the oil passage 139 and a check ball 141 of the check valve 141 is urged toward the oil passage 128 to block the oil passage 128, whereupon the oil passage 139 communicates with an oil passage 142 to apply the rear clutch 7 and release the front brake band 22. On the other hand, energizing the solenoid 137 moves the valve 136 to the left so that the communication between the oil passages 126 and 139 is cut off and the oil passage 139 is connected with a pressure discharge port 139a to be exhausted.

In the first speed at the drive range position or D position— 1st speed (cf. FIG. 4), both the solenoids 132 and 137 are energized and only the front clutch 6 is applied through the oil passage 124. Accordingly, when the transmission is operated from the engine, the one way brake 23 comes into operation to hold the carrier 13 against rotation and the first speed is thus provided. In this case, however, no driving force is transmitted from the output shaft 18 and thus the "freewheeling" condition occurs.

In the second speed at the drive range position or D position—2nd speed (cf. FIG. 5), the 1-2 shift solenoid 132 is deenergized with the oil passage 124 still supplying pressure to the front clutch 6 so that the oil passages 125 and 134 communicate with each other to apply the front brake band 22 thereby providing the second speed.

In the third speed at the drive range position or D position—3rd speed (cf. FIG. 6), under the condition in the second speed, the 2-3 shift solenoid 137 is further deenergized so that the oil passage 126 now communicates with the oil passage 139 to apply the rear clutch 7 and release the front brake band 22, thereby providing the third speed.

Now, with the manual valve 120 positioned to the 2 position (cf. FIG. 7), pressure to the 2-3 shift valve 136 through the oil passage 126 is cut off and only the oil passages 124 and 125 are now connected with the oil pressure source 100. In this condition, therefore, the third speed cannot be obtained regardless of the operating conditions of the 2-3 shift solenoid 137, and either the first or the second speed can be provided depending on the energization or deenergization of the 1-2 shift solenoid 132.

When the manual valve 120 is moved to the L position, pressure to the oil passages 125 and 126 is cut off and the oil passages 124 and 127 now communicate with the oil pressure source 100. This applies the front clutch 6 and the rear brake band 21 and the first speed is obtained. The first speed in this case differs from he first speed in the D position in that the rear brake band 21 is now applied thus carrying the driving force from the output shaft to the engine. This permits the engine to exert a braking effect on the car.

Figure 8:
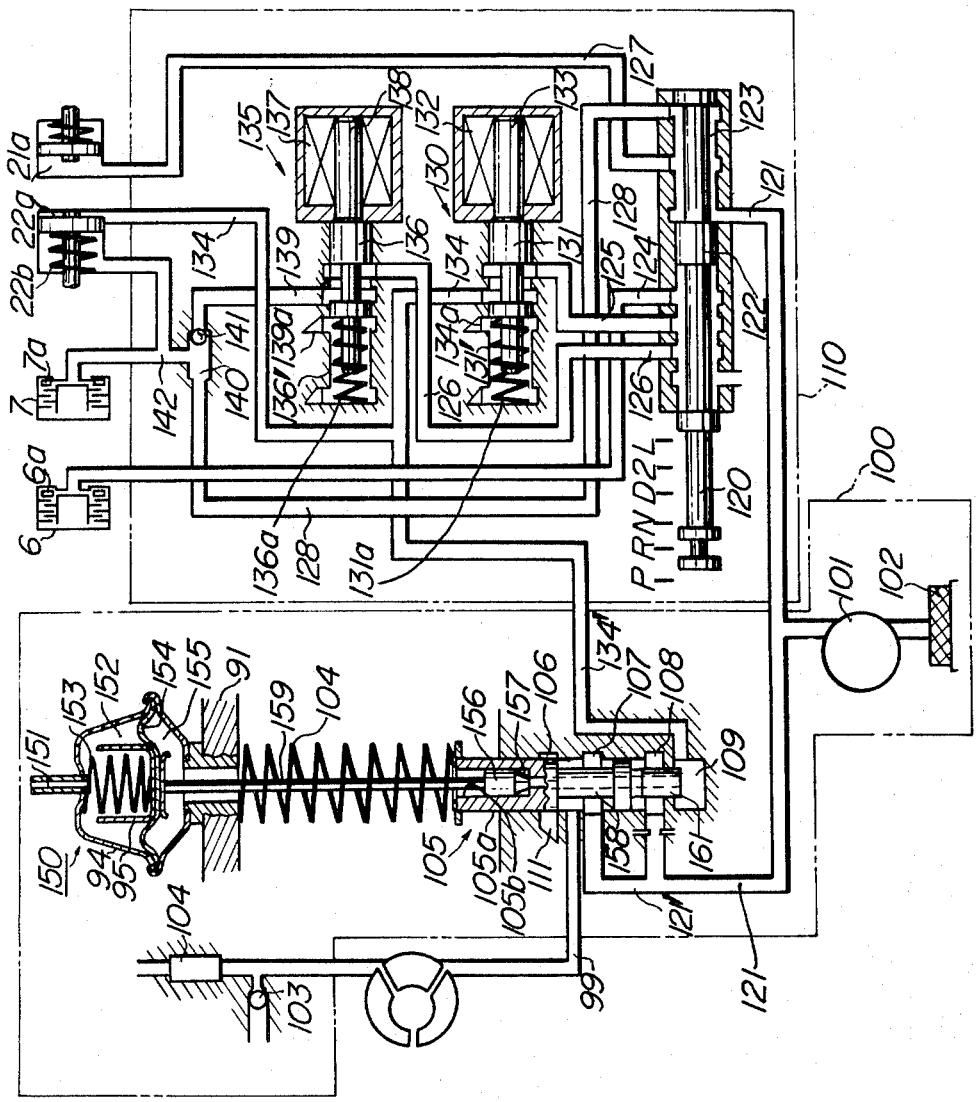

When the manual valve 120 is moved to the R position, pressure to the oil passages 124, 125 and 126 is cut off and the oil passages 127 and 128 now communicate with the oil pressure source 100 (cf. FIG. 8). Thus, reverse is obtained as the rear clutch 7 and the rear brake band 21 are applied.

As will be apparent from the foregoing, the automatic shifting action is accomplished in the above described embodiment through the actuation of the 1-2 shift means 130 and the 2-3 shift means 135, that is, depending upon whether the solenoids 132 and 137 are energized or not. This shift control which energizes or deenergizes the solenoids 132 and 137 will be effected in accordance with different driving conditions and it is well known since various methods have already been proposed with respect to this kind of shift control. While those systems which are disclosed in U.S. Pats. Nos. 3,068,715 and 3,019,666, for example, are known to the prior art, it is possible to predict that many novel systems for this kind of shift control may be developed in the future. Even with those shift control systems which will be newly developed, it is possible to apply the present invention to such newly developed techniques.

Figure 10:
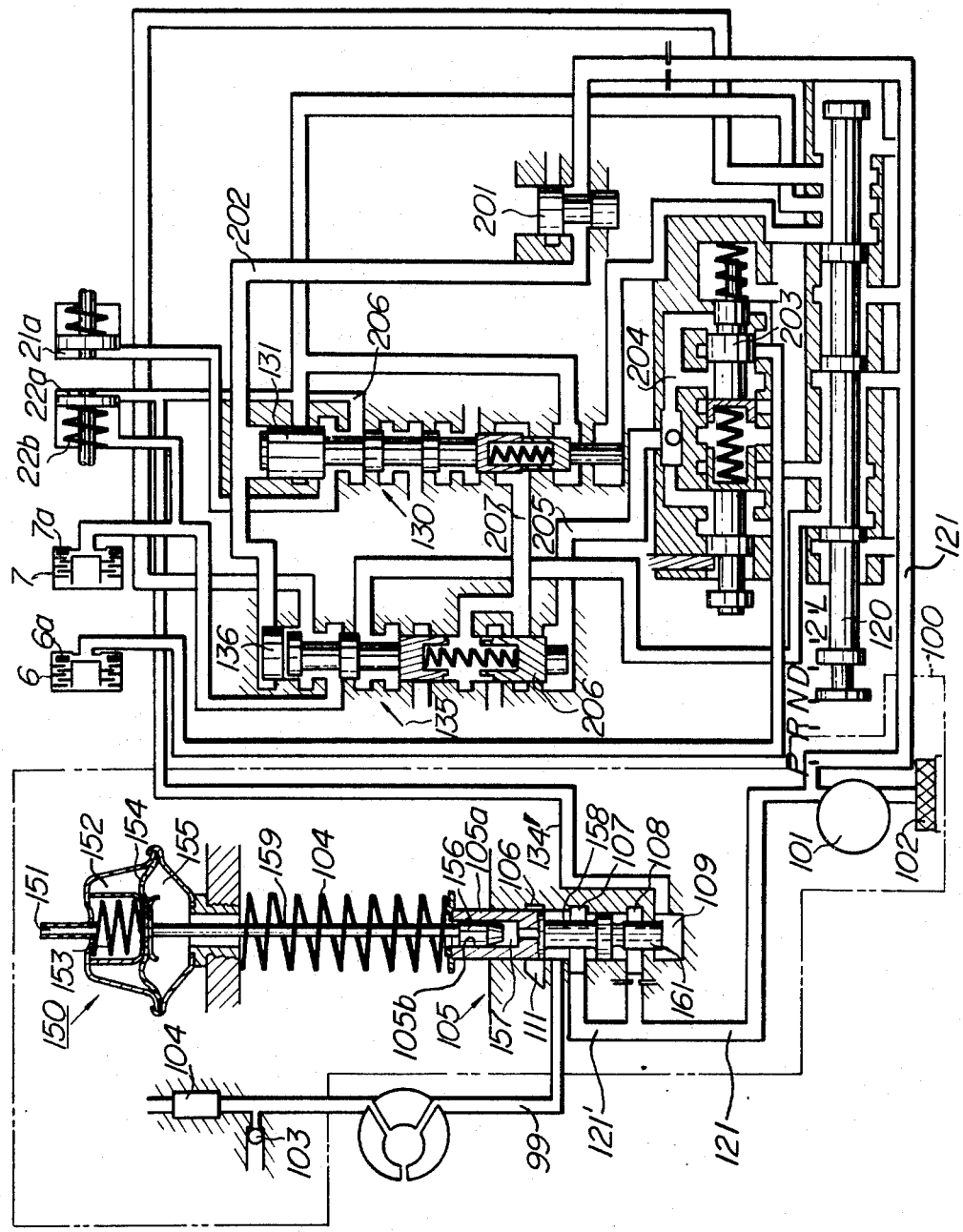
FIG. 10 is a schematic sectional view showing another form of the hydraulic actuation circuit incorporated in the system of the present invention, the circuit being in the D position—2nd speed.
Figure 13:
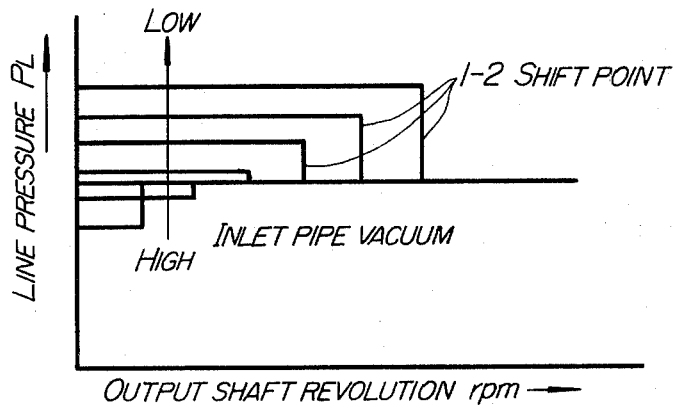
FIGS. 13 through 15 are modified forms of the line pressure $P_L$ graph of FIG. 12 attained according to the present invention.

In FIG. 10 there is shown another hydraulic circuit which can be used with the present invention. While the method of electrical shift control wherein the shift means 130 and 135 are actuated by means of the solenoids has been discussed in conjunction with the previously described embodiment, the embodiment shown in FIG. 10 illustrates, by way of an example, a shift control wherein shift valves are operated by means of oil pressures proportional to various driving conditions in accordance with the hitherto commonly practised procedures. In other words, a governor valve 201 is caused to produce in an oil passage 202 governor pressure Pgo which is based on car speed. On the other hand, a throttle valve 203 linked to the engine throttle valve and hence the accelerator pedal is caused to produce throttle pressure Pth proportional to the engine throttle opening thus supplying oil into oil passages 204 and 205. These governor pressure Pgo and throttle pressure Pth are directed into their associated oil chambers at the ends of the 1-2 shift valve 131 and the 2-3 shift valve 136, respectively, so that the shift valves 131 and 136 accomplish shifting operations in accordance with the driving conditions based upon comparison between the car speed and the engine throttle opening. In FIG. 10 there are illustrated the conditions in the D position—2nd speed, and in this circuit the valves have six positions: P, R, N, D, 2 and L, as in the first embodiment, thus providing similar operating conditions. In the said circuit, the throttle pressure Pth in the oil passage 205 is modulated by a valve 206 so that a constant lower throttle modulated pressure Pmth is produced in an oil passage 207 to be applied to the shift valves 131 and 136.

PRESSURE REGULATOR VALVE

Figure 11:
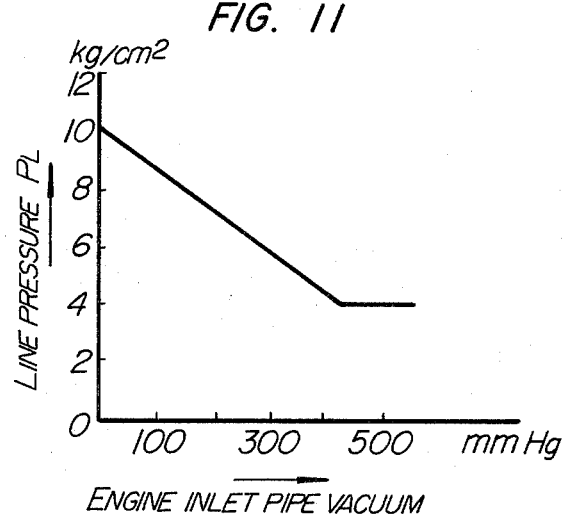
FIG. 11 is a graph showing changes in the value of line pressure $P_L$ controlled by the said hydraulic actuation circuit, with respect to the engine suction or inlet pipe vacuum.
Figure 12:
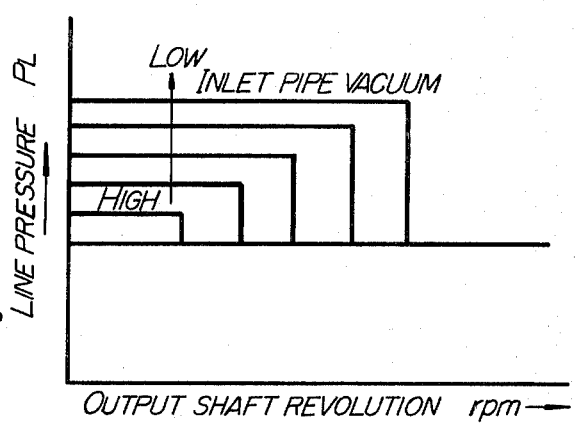
FIG. 12 is a graph showing changes in the value of line pressure $P_L$ controlled by said hydraulic actuation circuit, with respect to the output shaft rpm.

Oil pressure supplied to the servo means for the brake bands and clutches which perform shifting operation in the first mentioned embodiment, that is, the line pressure $P_L$ is controlled by the pressure regulator valve 105; and the present invention is characterized by this control system and the object of this control system is to provide the varying line pressures $P_L$ shown in the graphs of FIGS. 11 and 12.

Figure 9:
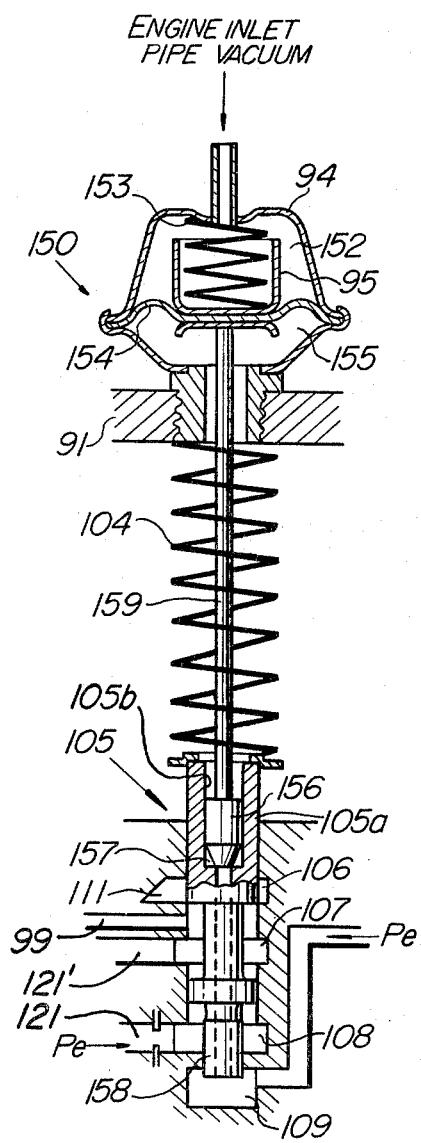
FIG. 9 is an enlarged sectional view showing a pressure regulator valve incorporated in said hydraulic actuation circuit.

The construction of the pressure regulator valve 105 constituting a feature of the present invention will now be explained with reference to FIGS. 3 through 8 and particularly to FIG. 9. The pressure regulator valve 105 is provided with four oil chambers 106, 107, 108 and 109 arranged in this order with the chamber 106 disposed at the top. The chamber 106 is connected to a pressure discharge circuit 111 which returns oil to an oil reservoir, and when a valve spool 105a of the pressure regulator valve 105 is in its upper position, the chamber 106 communicates with the chamber 107 to discharge the oil pressure in the oil chamber 107 thus effecting the oil flow control. The chambers 107 and 108 are interconnected by means of an oil passage 121' which is in turn connected with the oil passage 121 through which oil drawn up from the oil pump 101 is fed. With the valve spool 105a moved to its upper position in the chamber 107, oil is fed into a circulating circuit 99 leading to the torque converter. The chamber 109 is connected to the oil passage 134 through the oil passage 134'. This oil passage 134 applies the oil pressure from the oil passage 125 to the apply side 22a of the servo for the brake band 22 as the shift valve 131 of the 1-2 shift means 130 is operated, and when the shift valve 131 is operated so that a shift is made to the second speed gear, oil pressure is produced and this oil pressure is admitted into the valve chamber 109. Contrary, in the first speed the oil pressure in the oil passage 134 is drained by the pressure discharge circuit 134a so that the oil pressure in the chamber 109 also empties. A cylindrical bore 105b is made in the upper portion of the valve spool 105a and a plug 156 mounted on the lower end of a rod 159 is fitted into the bore 105b forming an oil chamber 157 therein. This chamber 157 communicates with the chamber 109 via a hole 158 formed through the valve spool 105a so that the presence of oil pressure in the chamber 157 depends on the presence of oil pressure in the chamber 109. Moreover, the two chambers 109 and 157 are adapted to apply two forces which oppose each other on the valve spool 105a so that force which acts on the valve spool 105a depends on the oil pressure receiving surface areas of the valve spool 105a in the chambers 109 and 157, respectively. In the drawings, the oil pressure receiving surface areas of the valve spool 105a in the two chambers 109 and 157 are the same with each other so that they exert no force on the valve spool 105a. Now assuming that the oil pressure receiving area is larger in the chamber 109 than in the other, the valve spool 105a will have a force that acts on it in the upward direction. If the oil pressure receiving area is larger in the chamber 157, the valve spool 105a will be acted on by a force that tends to move it downwards.

Diaphragm means 150 is provided above the pressure regulator valve 105. This diaphragm means 150 is formed with upper and lower chambers 152 and 155 which are closed by a diaphragm 154. The upper chamber 152 is provided with a coiled spring 153 which normally applies a downwardly acting pressure to the diaphragm 154 and at the same time the engine intake manifold vacuum normally acts to attract the diaphragm 154 upwards against the spring pressure of the coiled spring 153. In other words, the spring pressure of the coiled spring 154 is reduced by the inlet pipe vacuum and the difference spring pressure actually acts on the diaphragm 154. This spring pressure also acts on the valve spool 105a as a downwardly pressing force by virtue of the rod 159 which interconnects the diaphragm means 150 and the pressure regulator valve 105 in associated relation. Another coiled spring 104 is provided between the upper end of the valve spool 105a and a valve body 91 and the spring pressure of the coiled spring 104 is loaded on the valve spool 105a as a downwardly pressing force.

The operation of the pressure regulator valve 105 as described above will now be explained. The valve action that will take place when there is no oil pressure in the chamber 109 will be first discussed. In this case, opposing forces acting on the valve spool 105a of the pressure regulator valve 105 include pressure $P_1$ produced in the chamber 108 and serving as an upwardly acting force and spring pressure $P_2$ of the coiled spring 104 and pressure $P_3$ acting on the rod 159 through the diaphragm 150, the latter two pressures serving as downwardly acting forces. Thus, the valve spool 105a of the pressure regulator valve 105 is controlled by the balance between the downwardly acting forces $P_2 + P_3$ and the upwardly acting force $P_1$, and the oil pressure of the upwardly acting force $P_1$ is supplied to the oil passage 121a and consequently to the oil passage 121. However, since the spring pressure of the coiled spring 104 is predetermined providing a constant spring pressure, only the pressure $P_3$ of the downwardly acting forces, that is, the pressure by virtue of the diaphragm means 150 changes and the pressure regulator valve 105 is controlled in accordance with this varying pressure. Since the pressure exerted through the diaphragm means 150 varies in proportion to the engine inlet pipe vacuum as previously described, the lower the engine intake manifold vacuum is, the greater the pressure provided by the diaphragm means 150. Thus, this pressure is reduced in inverse proportion as the inlet pipe vacuum pressure gradually increases, and this inversely proportioned relation continues until a supporting member 95 of the diaphragm 154 engages a casing 94, and thereafter the pressure remains at a lower constant level. Due to the fact that this varying pressure is applied to the valve spool 105a of the pressure regulator valve 105 from the diaphragm means 150 through the rod 159, the oil pressure in the chamber 108 also varies in proportion to the said varying pressure as already mentioned so that the line pressure $P_L$ produced in the chamber 108 is represented in the form of a curve that gradually declines as the engine inlet pipe vacuum increases, as shown in FIG. 11.

The oil pressure applied to the pressure regulator valve 105 is controlled by discharging the oil pressure in the chamber 107 to the pressure discharge circuit 111 through the chamber 106 thereby regulating the oil flow. In other words, when the oil pressure in the chamber 108 is insufficient, the said pressure discharging flow control operation is limited, that is, the communication between the chambers 107 and 106 is limited largely or cut off so that the oil pressure can rapidly build up in the chamber 108, whereas the opening that provides communication between the chambers 107 and 106 is widened to discharge more pressure for flow controlling purpose.

Now valve action that will take place when there is oil pressure in the chamber 109 will be explained hereunder. The oil pressure which exists in the chamber 109 is also admitted into the chamber 157 through the hole 158. Thus, the plug 156 is urged upwards by the oil pressure in the chamber 157 so that the plug 156 disengages the valve spool 105a and the action of the engine inlet pipe vacuum can no longer be applied to the valve spool 105a. In this condition, the pressure regulator valve will be controlled by the balance between the spring pressure $P_2$ of the coiled spring 104 and the pressure $P_1$ produced in the chamber 108. However, since the spring pressure $P_2$ due to the coiled spring 104 is constant at all times, the oil pressure produced in the chamber 108, that is, the line pressure $P_L$ is delivered as a pressure of a constant value proportional to the pressure $P_2$. In this case, the oil pressure of the line pressure $P_L$ is the same as the minimum value of the line pressure $P_L$ in the previously discussed case. That is, it is the constant low line pressure $P_L$ in FIG. 11.

The two conditions of hydraulic control as described above are attained depending on the presence of oil pressure in the oil chamber 109. And since the chamber 109 is connected to the oil passage 134 through the oil passage 134' and since the oil pressure (line pressure $P_L$) to the oil passage 134 is admitted or shut off depending on the actuation of the 1-2 shift valve 131, the said hydraulic control conditions may be changed from one to another according to the actuation of the 1-2 shift valve 131. That is, in the first gear speed no oil pressure is admitted into the oil passage 134 and thus said one hydraulic control condition that varies in proportion to the inlet pipe vacuum is obtained, whereas in the second speed gear oil pressure is admitted into the oil passage 134 and consequently into the chamber 109 so that said other hydraulic control condition is obtained which maintains the situation constant. FIG. 12 is a graph showing this change over from one hydraulic control condition to another in respect of the output shaft rpm (car speed). As will be seen from this figure, as the output shaft rpm increases and the speed ratio is shifted from the first to the second speed, the line pressure so far changing in proportion to the inlet vacuum steps down to a constant low pressure at this time. However, since it is so arranged that the 1-2 shift point generally varies in accordance with the engine torque responsive signals, such a step down point to the constant low pressure changes in accordance with the engine torque responsive signals. Thus, as shown in FIG. 12, the higher the engine intake manifold vacuum is, the earlier the step down of the pressure takes place, and as the engine inlet pipe vacuum decreases, the timing at which the step down occurs is gradually delayed.

The change over of hydraulic control as described above may take place when the manual valve 120 is positioned to its D position or 2 position so that oil pressure is directed to the oil passage 125 leading to the 1-2 shift valve 131. It is to be understood that the hydraulic control as described above may be similarly incorporated in the modified hydraulic circuit of the present invention shown in FIG. 10.

Furthermore, the following practical applications of the above described embodiments of the present invention may be made:

A. While, in the above described embodiments, the oil passage 134 leading from the 1-2 shift valve 131 to the servo chamber is connected to the chamber 109 of the pressure regulator valve 105 so that the line pressure $P_L$ may be stepped down simultaneously with a shift to the second speed gear, the oil passage 139 leading from the 2-3 shift valve 136 to the servo chambers may be connected to the chamber 109 of the pressure regulator valve so that the line pressure $P_L$ is stepped down as soon as a shift is made to the third speed gear.

Figure 14:
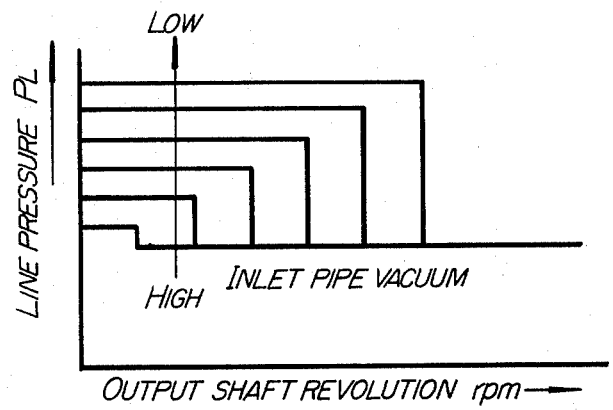

B. The line pressure characteristic attained in the above described embodiments as shown in FIG. 12, depends on a condition that the diameter $d_1$ of the valve spool in the chamber 109 of the pressure regulator valve 105 is equal to the diameter $d_2$ of the chamber 157. Thus, if there is a relation $d_2 > d_1$, the line pressure characteristic shown in FIG. 14 may be obtained, and any desirable line pressure characteristic may be easily attained as occasion demands.

Figure 15:
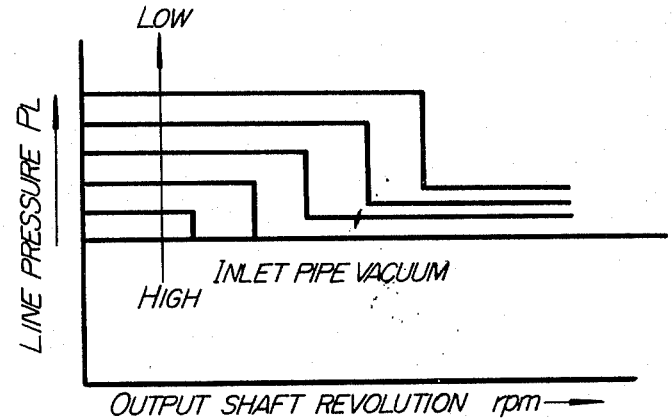

C. Depending on the selection of various controlling factors which determine the relative relation between the force applied to the valve spool 105a from the diaphragm means 150 through the rod 159 and the force acting on the plug 156 to urge it upward which pressure is produced by the oil pressure admitted into the chamber 157 when an upshift is made from first to second gear, if the engine intake manifold vacuum is low, such a 1-2 upshifting may not cause the plug 156 to come out of engagement with the valve spool 105a, that is, the force from the diaphragm may still act on the pressure regulator valve 105. In this case, the line pressure characteristics such as shown in FIG. 15 may be obtained and there are some cases where such characteristics are desired.

Owing to the fact that the controlled line pressure characteristics as detailed in the above are obtainable according to the present invention, a line pressure taking into consideration the engine output and the torque multiplying action of the torque converter can be supplied, at a low engine speed, to the hydraulic servo chambers for the clutches and brake bands thus providing forces which are sufficient but not too large to effectively apply the clutches and brake bands, while a constant low line pressure can be directed to the hydraulic servos at a high engine speed in order to prevent the power loss due to the oil pump loss and the like since the torque converter will be acting as a fluid coupling or in a state close to it at such a high engine speed thus providing no torque multiplying action.

According to the present invention, a heavy shock which has hitherto been experienced when the shifts are made by the manual valve and also during the power off and upshifting in low gear, can be eliminated to smooth out the automatic shifts so that the driver can enjoy comfortable driving.

Having described the particular embodiments of the present invention as incorporated in an automatic transmission having three forward speeds and one reverse speed, it is to be understood that any person who understand fully the technical material disclosed in the present invention may make various other changes and modifications without departing from the spirit and scope of the appended claims. This is evident from the abutment technical disclosure of the present invention.

We claim:

1. In an automatic transmission driven by an engine having a throttle valve and including an input shaft, an output shaft and hydraulic servo means for actuating brake means and clutch means to provide a plurality of gear ratios between said input and output shafts in accordance with the actuation of said brake means and clutch means, a hydraulic control system comprising:

a hydraulic pressure source for supplying pressure oil to said hydraulic servo means through oil passage means;

shift valves connected in said oil passage means and adapted to be actuated by signals corresponding to driving conditions to establish a higher forward gear ratio by connecting an oil passage to said oil passage means leading to a hydraulic servo in said hydraulic servo means with said hydraulic pressure source for establishing a higher forward gear ratio, said shift valves draining said oil passage to establish a lower forward gear ratio; and a pressure regulator means connected to said hydraulic pressure source for controlling pressure oil from said hydraulic pressure source, said pressure regulator valve means including:

a valve spool, a spring acting on said valve spool, a first coil chamber communicating with said hydraulic pressure source to apply a force to said valve spool against a biasing force of said spring, a second oil chamber communicating with said hydraulic pressure source, a third oil chamber communicating with an exhaust passage for discharging a portion of pressure oil from said hydraulic pressure source when said valve spool is shifted in a direction to compress said spring and said second oil chamber thereby communicates with said third oil chamber, diaphragm means responsive to intake manifold vacuum of said engine induced by said throttle valve for producing a force corresponding to said intake manifold vacuum, a member having one end thereof in contact with said diaphragm means and having the other end thereof in contact with said valve spool to apply the force produced by said diaphragm means to said valve spool in the same direction as the biasing force of said spring, the said other end of said member being disposed in oil-tight sliding contact with an inner wall of a hole provided in one end of said valve spool, a fourth oil chamber adapted, when supplied with pressurized oil, to apply a force to an end face of the other end of said valve spool against the biasing force of said spring and, simultaneously, to apply hydraulic pressure to an end face of said other end of said member by way of an oil passage, which axially penetrates said valve spool, in a direction opposite to the force applied by said member to said valve spool, a fifth oil chamber defined by the inner wall of the hole provided in one end of said valve spool and said other end of said member, and, when supplied with pressurized oil, adapted to apply a force to said valve spool in a direction opposite to the force applied to the end face of the other end of said valve spool by said fourth oil chamber, and a conduit connecting said fourth chamber and said oil passage whereby said fourth chamber is supplied with oil in the higher forward gear ratio position and is drained in the lower forward gear ratio position so that in the higher forward gear position but not in the lower forward gear ratio, said force applied by said diaphragm means to said valve spool corresponding to said intake manifold vacuum may be counteracted.

2. A hydraulic control system according to claim 1 wherein the size of a diaphragm of said diaphragm means and the area of the end face of said other end of said member for receiving hydraulic pressure from said fourth oil chamber are chosen so that the force applied to the end face of said other end of said member from said fourth oil chamber may always be greater than the force applied to said one end of said member from said diaphragm means, whereby changes in the hydraulic pressure applied to the hydraulic servo means are not affected by the magnitude of the intake manifold vacuum in the higher forward gear ratio position.

3. A hydraulic control system according to claim 1 wherein the area of the end face of the other end of said valve spool for receiving hydraulic pressure from said fourth oil chamber is chosen to be equal to a transverse surface area in said valve spool for receiving hydraulic pressure from said fifth oil chamber so that the axial forces applied to said valve spool by said fourth oil chamber and by said fifth oil chamber may cancel each other, whereby the maximum hydraulic pressure for the higher forward gear ratio becomes lower than the maximum hydraulic pressure for the lower forward gear ratio, whereas, the minimum hydraulic pressure is maintained the same both for the higher forward gear ratio and the lower forward gear ratio.

* * * * *